(12) United States Patent
Scholz et al.

(10) Patent No.: US 7,825,761 B2
(45) Date of Patent: Nov. 2, 2010

(54) MEASUREMENT TRANSMITTER

(75) Inventors: Wolfgang Scholz, Minden (DE); Frank Marks, Düsseldorf (DE)

(73) Assignee: ABB AG, Mannheim (DE)

( * ) Notice: Subject to any disclaimer, the term of this patent is extended or adjusted under 35 U.S.C. 154(b) by 861 days.

(21) Appl. No.: 11/790,277

(22) Filed: Apr. 24, 2007

(65) Prior Publication Data
US 2007/0279173 A1 Dec. 6, 2007

(30) Foreign Application Priority Data
Apr. 27, 2006 (DE) .................. 10 2006 019 555

(51) Int. Cl.
*H01F 27/02* (2006.01)
(52) U.S. Cl. ...................................... 336/83
(58) Field of Classification Search .............. 336/65, 336/83, 200, 206–208, 223, 232, 90–96
See application file for complete search history.

(56) References Cited
U.S. PATENT DOCUMENTS
4,038,625 A * 7/1977 Tompkins et al. ............ 336/83
4,627,292 A * 12/1986 Dekrone ...................... 73/728
6,268,785 B1 * 7/2001 Kollman et al. ............. 336/83
6,457,367 B1 10/2002 Behm et al.

FOREIGN PATENT DOCUMENTS
DE 40 33 052 C2 10/1992
DE 197 19 730 C1 10/1998
DE 198 59 557 A1 8/1999
EP 0 489 848 B1 9/1995

OTHER PUBLICATIONS
"Contrans P MeBumformer ARK 200 Für Differenzdruck, DurchFluB, Füllstand" (Contrans P Measurement transmitter ARK 200 for Differential Pressure, Flow rate and Fluid Leve) From Schoppe & Faeser Gmbh Document No. 42/15-190-3, 17 Pages.

* cited by examiner

*Primary Examiner*—Tuyen Nguyen
(74) *Attorney, Agent, or Firm*—Buchanan Ingersoll & Rooney PC

(57) ABSTRACT

The invention relates to a measurement transmitter for operation in a process plant. The enclosure of the measurement transmitter comprises two mutually separate containers (11, 12), where the transducer for converting the process-related, physical variable into an appropriate electrical variable is housed in the one container (11), and an electronic circuit (22) is arranged in the other container (12). The two containers (11, 12) have complimentary screw threads (51, 52) to each other, and are screwed together directly. The screw connection of the two containers (11, 12) comprises a transformer made up of two parts (31, 32), whose parts (31, 32) each comprise a winding (41, 42) connected to the circuitry (21, 22) of the respective container (11, 12).

6 Claims, 2 Drawing Sheets

MEASUREMENT TRANSMITTER

TECHNICAL FIELD

The invention relates to a measurement transmitter for operation in a process plant.

BACKGROUND INFORMATION

Such measurement transmitters are used for converting a process-related physical variable into an electrical variable, and are hence arranged as local, process-level devices in the field environment.

Known measurement transmitters are connected to a central device by means of a connecting cable, via which each measurement transmitter is supplied with electrical power for its operation and transfers data with the central device. When measurement transmitters are connected in the hazardous area of a process plant, electrical equipment must meet specific requirements in order to exclude the possibility of an accidental explosion. When installing and commissioning electrical installations and equipment and when maintaining electrical installations and equipment in process plants, which are located in a potentially explosive atmosphere because of their specific function, relevant legal regulations must be observed, such as the "Verordnung über elektrische Anlagen in explosionsgefährdeten Bereichen-ElexV" (German regulation on electrical equipment in hazardous areas) and the EN 50 014 series of European standards on explosion protection.

U.S. Pat. No. 6,457,367 B1 and the instruction manual "Contrans P Messumformer ARK 200 für Differenzdruck, Durchfluss, Füllstand" (Contrans P Measurement transmitter ARK 200 for differential pressure, flow rate and fluid level") from Schoppe & Faeser GmbH, document number 42/15-190-3, disclose measurement transmitters whose enclosure essentially comprises two mutually separate containers, where the transducer for converting the process-related, physical variable into an appropriate electrical variable is housed in the one container, and an electronic circuit containing at least circuitry for measurement-signal processing and communication is arranged in the other container.

The two containers have complimentary screw threads to each other, and are screwed together directly. Electrical wires for connecting the transducer to the electronic circuit are fed through the screw connection. The electrical wires are part of a multi-core power-transmission and data-transmission cable.

It is known to have a fixed connection to the cable at one end and to have a plug-in design at the other end. If the cable is plugged in before screwing the containers together, the cable is twisted by the number of thread turns as they are screwed together, and then held in the twisted state. Alternatively, the cable can be wound up in an open reel sleeve in the manner shown in European patent EP 489 848 B1. In this case, there is the risk of damaging the cable or its connections at the connector or at the connection points at the opposite end of the cable from the connector. The number of thread turns depends on the type of thread and the permitted tolerances, taking into account the legal regulations cited in the introduction, where a minimum ratio of gap length to gap width must be maintained. In particular for the "flameproof enclosure" degree of protection, the cable needs to be twisted a plurality of times because a larger number of thread turns are required. This design is fault-prone, complex and difficult to handle.

The alternative is to plug in after screwing the modules together. This means it is necessary to ensure that the cable is not squashed when screwing the modules together. In addition, the end of the cable must be connected to the analysis electronics in a very confined space, and the electronics compartment must be opened.

SUMMARY

Thus the object of the invention is to develop further a generic measurement transmitter in such a way that, when joining the containers together, the electrical connection required between the two containers is made without further assistance.

The invention is based on a measurement transmitter whose enclosure essentially comprises two mutually separate containers, where the transducer for converting the process-related, physical variable into an appropriate electrical variable is housed in the one container, and an electronic circuit containing at least measurement-signal-processing and communications circuitry is arranged in the other container. The two containers have complimentary screw threads to each other, and are screwed together directly.

According to the invention, the screw connection of the two containers comprises a transformer made up of two parts, whose parts each comprise a winding connected to the circuitry of the respective container.

The two containers are in the screwed-together state during the intended use of the measurement transmitter. The two parts of the transformer are thereby joined together and thus form an electrical transformer. In this state, the windings of the transformer are inductively coupled and suitable for transmission of both power and communications signals between the circuitry of the respective containers.

On separating the two containers, when the measurement transmitter is not being used for its intended use, the two parts of the transformer are disconnected from each other without particular assistance, with the inductive coupling of the two parts of the transformer being removed in the process. After leaving the last thread turn of the screw connection, the two containers are mechanically and electrically disconnected from each other.

On joining together the two containers of the measurement transmitter, the two parts of the transformer are joined together without further assistance. On reaching the last thread turn, the two parts of the transformer are combined into an electrical transformer.

Disconnection and connection of the circuitry of the associated containers is advantageously achieved as such without further assistance by separating and joining the containers. Assembly/disassembly is very simple in this case, and can even be performed in the process plant using thick gloves.

In addition, the invention enables the instrumentation to be replaced under process conditions. In a suitable embodiment, the connection to the electronics compartment can be encapsulated as a gas-tight and dust-tight enclosure. Thus for assembly, only the wiring compartment on one of the containers needs to be opened for connecting the cable. The sensitive circuitry electronics is protected from moisture penetration and contamination.

When disassembling instrumentation and electronics, damage to the electrical connection or to the circuitry electronics caused by the connecting cable of the previously known embodiment is avoided.

The design according to the invention means that the two containers housing the instrumentation and electronic circuitry are galvanically isolated by the nature of the construction. This can be used advantageously to improve the EMC immunity or to achieve the insulation strength between input terminals and enclosure.

According to another feature of the invention, one of the transformer parts is fixed in its container, and the associated second transformer part is spring-mounted in its container. The magnetic properties of the transformer thereby advantageously do not depend on tolerances in the mechanical machining of the containers.

According to another feature of the invention, the transformer part in the instrumentation container is spring-mounted. Consequently, the transformer part in the container housing the measurement-signal-processing and communications circuitry is fixed. In this case, the container housing the measurement-signal-processing and communications circuitry can be designed in accordance with the regulations for the "flameproof enclosure" degree of protection. Under these conditions, the two containers can advantageously be separated safely in a potentially explosive atmosphere in the field of the process plant.

In addition, a shorter thread length is advantageously sufficient for the screw connection, because the screw thread is no longer relevant for explosion protection.

BRIEF DESCRIPTION OF THE DRAWINGS

The invention is described in more detail below with reference to an exemplary embodiment. For this purpose.

DETAILED DESCRIPTION

The first container 11 houses circuitry 21 comprising a transducer for converting the process-related, physical variable into an appropriate electrical variable, and an electronic interface. This module is called an instrumentation module below.

The second container 12 houses measurement-signal processing and communications circuitry 22. This module is called a processing module below.

Figure 1:
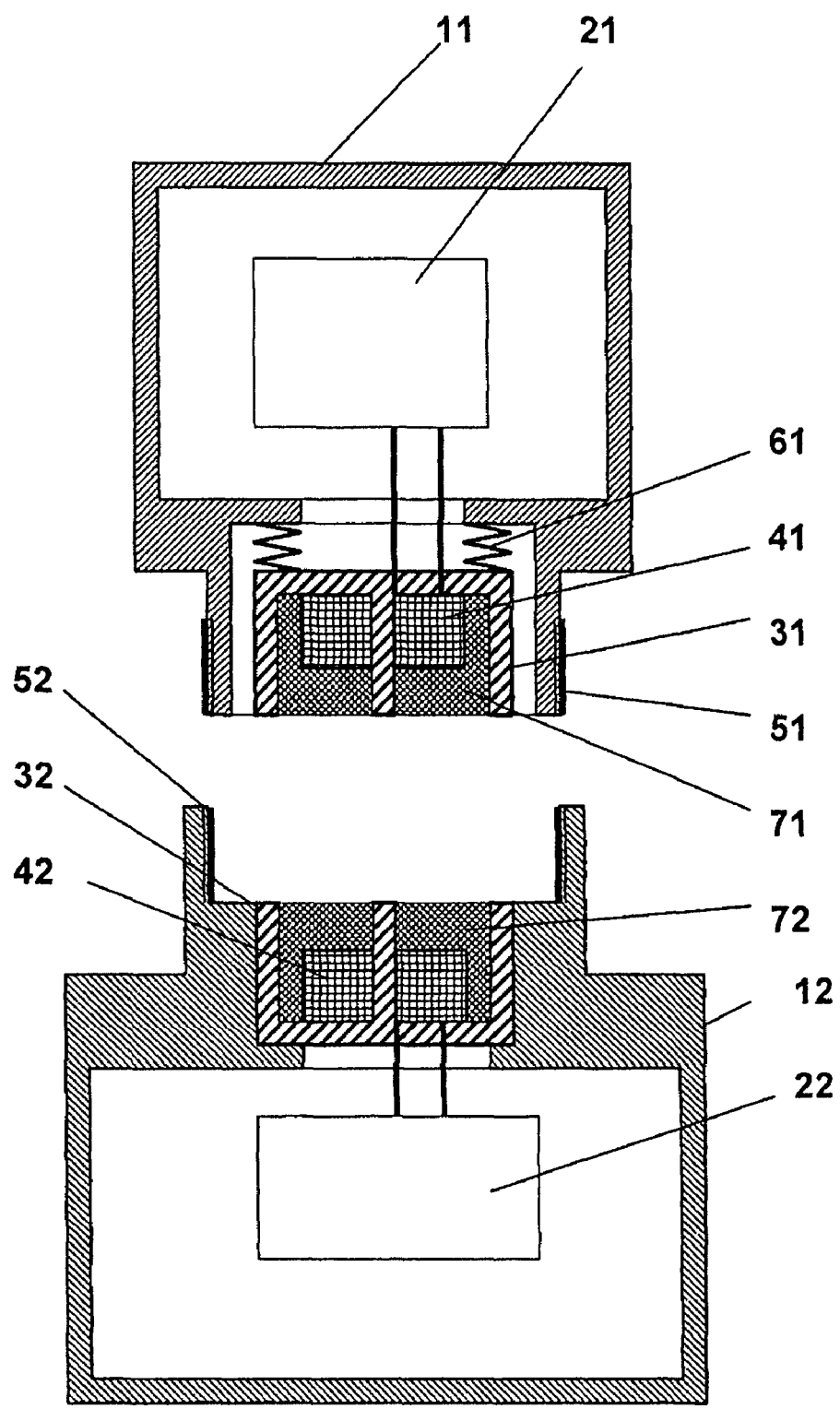
FIG. 1 shows a measurement transmitter according to the invention, whose enclosure is split into two containers, with the containers separated.
Figure 2:
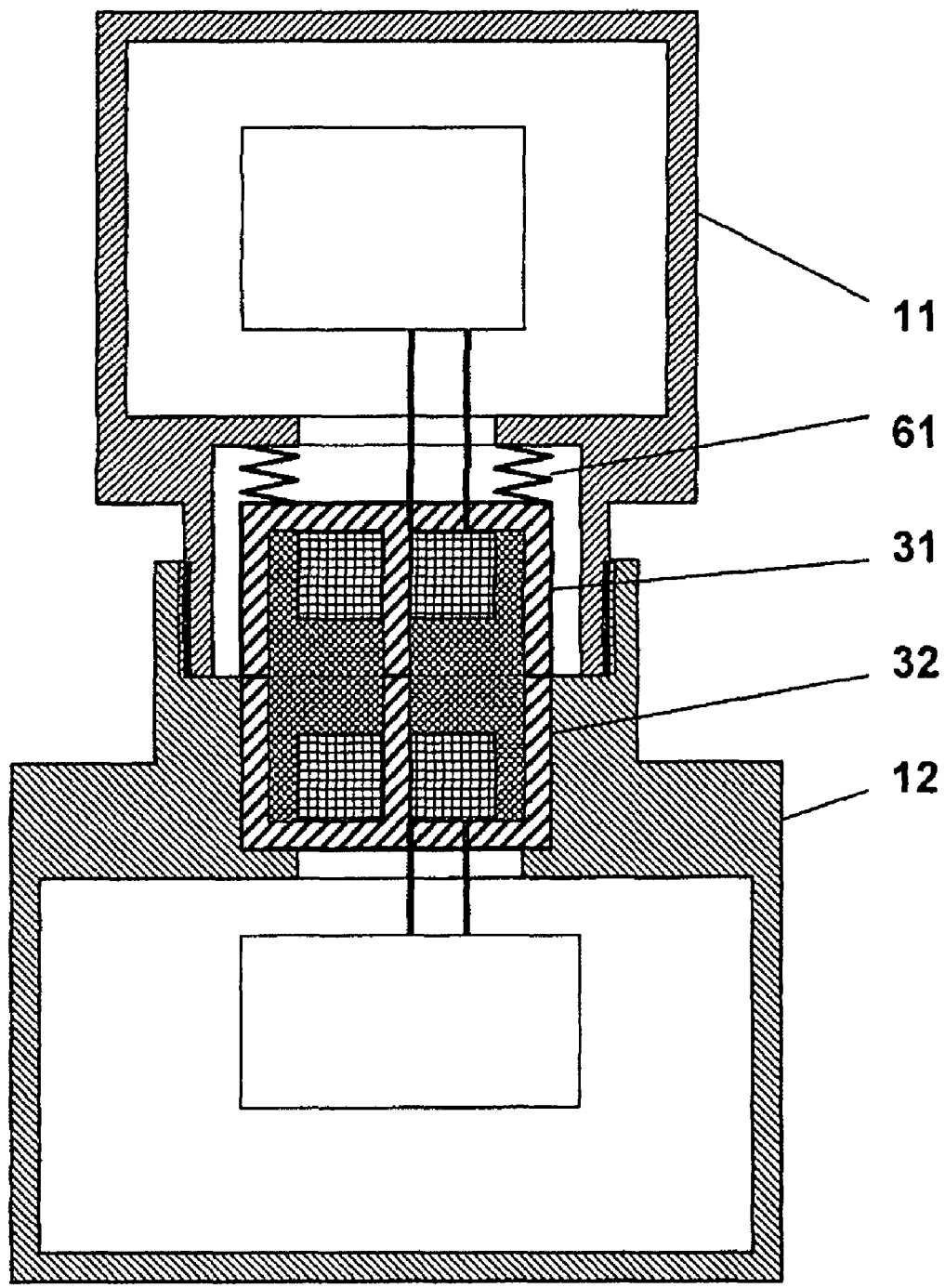
FIG. 2 shows the containers joined together, in each case in cross section, where those parts that are essential to the invention are shown and where the same reference numbers are used for the same means in each figure.

The two containers 11 and 12 have complimentary screw threads to each other. As shown in the diagram in FIG. 1, the container 11 of the instrumentation module is provided with an external thread 51, and the container 12 of the processing module is provided with an internal thread 52. During intended use, the two containers 11 and 12 are in the screwed-together state as shown in the diagram in FIG. 2.

In this state, the external thread 51 of the instrumentation module, and the internal thread 52 of the processing module form a screw connection. In particular, this screw connection is gas-tight and dust-tight.

Internally, the screw connection of the two containers 11 and 12 comprises a transformer made up of two parts 31 and 32. In the simplest embodiment of the invention, the transformer is composed of a standard pot core made of a ferrite material, which is substantially rotationally symmetric and is made up of two identical halves.

One core half 31 is housed in the container 11 of the instrumentation module and is arranged concentrically to the external thread 51. The core half 31 is equipped with a winding 41, which is connected to the circuitry 21. The winding 41 is potted in the core half 31 by a potting compound 71.

In addition, the core half 31 is spring-mounted in the container 11 of the instrumentation module. At least one compression spring 61 is provided for the purpose, whose spring force pushes the core half 31 out of the container 11 towards the corresponding container 12 of the processing module.

The second core half 32 is arranged in the container 12 of the processing module. The core half 32 is equipped with a winding 42, which is connected to the circuitry 22. The winding 42 is potted in the core half 32 by a potting compound 72. In the region of the screw connection, the core half 32 is arranged concentrically to the internal thread 52 and is fixed to the container 12 of the processing module.

In a particular embodiment of the invention, the core half 32 is integrated in the container 12 of the processing module so as to be flameproof encapsulated.

Under these conditions, the two containers 11 and 12 can advantageously be separated safely in a potentially explosive atmosphere in the field of the process plant.

The two containers 11 and 12 are in the screwed-together state during the intended use of the measurement transmitter. The two core halves 31 and 32 of the transformer are thereby joined together and thus form an electrical transformer. In this state, the windings 41 and 42 of the transformer are inductively coupled and suitable for transmission of both power and communications signals between the circuitry 21 and 22 of the instrumentation module and the processing module.

The processing module is connected to a field bus and is supplied with power via the field bus cable. The instrumentation module is supplied from the processing module, where the supply power is transmitted inductively to the instrumentation module via the transformer. It is known that an AC voltage is suitable for inductive transmission. The circuitry 21 in the instrumentation module thus comprises at least one rectifier circuit for converting the received AC voltage into a DC supply voltage for the transducer for converting the process-related, physical variable into an appropriate electrical variable, and for the electronic interface.

In a simple embodiment of the invention, a communications signal for data transfer between the instrumentation module and the processing module can be superimposed on the AC voltage for supplying the instrumentation module.

In an alternative embodiment of the invention, it can be provided to perform the data transfer between the instrumentation module and the processing module independently of the inductive transmission path via the transformer. Radio-transmission and infrared-transmission techniques known per se can be used for this purpose.

List of references

| | |
|---|---|
| 11, 12 | container |
| 21, 22 | circuitry |
| 31, 32 | transformer part |
| 41, 42 | winding |
| 51 | external thread |
| 52 | internal thread |
| 61 | compression spring |
| 71, 72 | potting compound |

What is claimed is:

1. A measurement transmitter having an enclosure, which essentially comprises two mutually separate containers, where the transducer for converting the process-related, physical variable into an appropriate electrical variable is housed in the one container, and an electronic circuit containing at least measurement-signal-processing and communications circuitry is arranged in the other container, said two containers having complimentary screw threads to each other, and being screwed together directly, wherein the screw connection of the two containers comprises a transformer made up of two parts, whose parts each comprise a winding connected to the circuitry of the respective container.

2. The measurement transmitter as claimed in claim 1, wherein one of the transformer parts is fixed in its container, and the associated second transformer part is spring-mounted in its container.

3. The measurement transmitter as claimed in claim 2, wherein the transformer part in the instrumentation container is spring-mounted, and the transformer part in the container housing the measurement-signal-processing and communications circuitry is fixed.

4. The measurement transmitter as claimed in claim 3, wherein the container housing the measurement-signal-processing and communications circuitry is encapsulated with the transformer part as a gas-tight and dust-tight enclosure.

5. The measurement transmitter as claimed in claim 4, wherein the container housing the measurement-signal-processing and communications circuitry is encapsulated with the transformer part as a flameproof enclosure.

6. The measurement transmitter as claimed in claim 1, wherein each transformer part is equipped with a winding that is potted by the core material.

\* \* \* \* \*